(12) United States Patent
Crilly

(10) Patent No.: US 6,540,521 B1
(45) Date of Patent: Apr. 1, 2003

(54) SYSTEM AND METHOD FOR APPLYING STANDARDS TO ADAPT GENERIC EDUCATIONAL MATERIALS FOR USE IN DIFFERENT STATES AND REGIONS

(75) Inventor: Andrew Crilly, Honolulu, HI (US)

(73) Assignee: The Ohana Foundation, Cupertino, CA (US)

(*) Notice: Subject to any disclaimer, the term of this patent is extended or adjusted under 35 U.S.C. 154(b) by 0 days.

(21) Appl. No.: 09/665,973

(22) Filed: Sep. 20, 2000

(51) Int. Cl.[7] .............................................. G09B 19/00
(52) U.S. Cl. ........................................ 434/365; 434/322
(58) Field of Search ................................ 134/350, 322, 134/323, 118, 119, 236; 434/362, 365

(56) References Cited

U.S. PATENT DOCUMENTS

| 5,308,244 A | * | 5/1994 | Hirose ........................ 434/169 |
| 5,810,605 A | * | 9/1998 | Siefert ........................ 434/362 |
| 5,823,789 A | * | 10/1998 | Jay et al. .................... 434/365 |
| 5,829,983 A | * | 11/1998 | Koyama et al. ............ 434/118 |
| 6,146,148 A | * | 11/2000 | Stuppy ........................ 434/322 |
| 6,149,441 A | * | 11/2000 | Pellegrino et al. .......... 434/350 |
| 6,164,975 A | * | 12/2000 | Weingarden et al. ....... 434/322 |
| 6,270,351 B1 | * | 8/2001 | Roper ......................... 434/118 |

* cited by examiner

Primary Examiner—Joe H. Cheng
Assistant Examiner—Kathleen M Christman
(74) Attorney, Agent, or Firm—Skjerven Morrill, LLP

(57) ABSTRACT

A system and method for applying standards to adapt generic educational materials for use in different states and regions is provided. The system includes the use of an interactive player that includes storage for a series of video, audio and text assets. This storage typically takes the form of a DVD disk. The assets stored on the DVD disk are generic, meaning that they are broadly applicable to a range of different locales. The interactive player determines its operating location by querying its user (typically a teacher). The interactive player uses that location to perform a web search. The web search returns a list of URLs, each corresponding to a web page containing an educational standard relevant to the operating location. The teacher uses these web pages to adapt lesson plans to the particular operating location. The teacher can then use the interactive player to present interactive multimedia and region specific lessons.

5 Claims, 2 Drawing Sheets

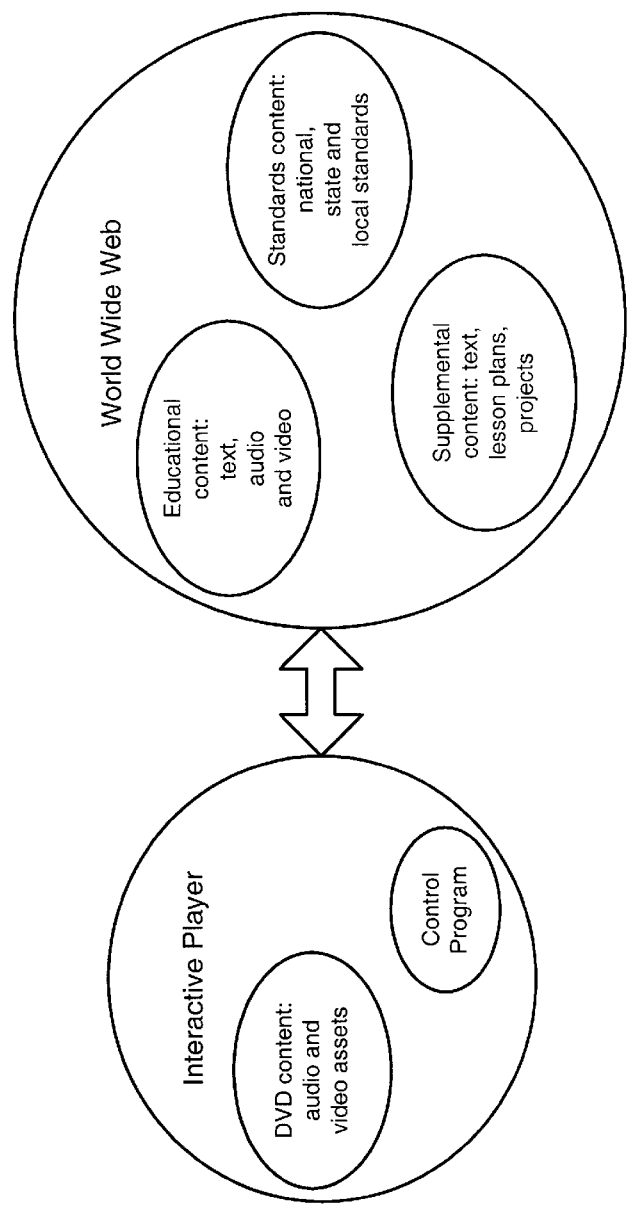

SYSTEM AND METHOD FOR APPLYING STANDARDS TO ADAPT GENERIC EDUCATIONAL MATERIALS FOR USE IN DIFFERENT STATES AND REGIONS

TECHNICAL FIELD OF THE INVENTION

The present invention relates generally to methods for delivering educational content to classrooms. More particularly, the present invention includes a method for applying standards, project-based learning, and non-sequential, interactive presentation to adapt generic educational materials for use in different states and regions and improve the level of understanding and learning of such generic material.

BACKGROUND OF THE INVENTION

Providing educational materials for use in classrooms is a difficult and expensive process. This is attributable, at least in part, to the increasing number of student performance standards that must be met while using these materials. In the United States, for example, the content of educational materials may be regulated at the federal, state, and local levels. Making a textbook (or other educational instrument) that relates to the relevant student performance standards that apply to a particular location can be complex. Making the same textbook satisfy such standards for a range of locations, in different localities and states, may be nearly impossible.

For these reasons and others, a need exists for systems that allow relevant performance standards to be readily addressed by educational materials. To be effective, such systems should support the adaptation of educational materials to a wide range of different locales. Such systems should be easy to use for a wide range of users, including teachers and other educational professionals, and be minimal in cost.

SUMMARY OF THE INVENTION

The present invention includes a system and method for correlating student performance standards to generic educational materials for use in different states and regions. For a typical embodiment, participating classrooms are equipped with interactive appliances. Each interactive appliance works in combination with a television or other display device. The interactive appliances have network interfaces to access the Internet and World Wide Web. Each interactive appliance also includes a playback device for a DVD or other mass storage/retrieval media. Operation of the interactive appliance is controlled using an interface program.

One or more DVD disks are distributed to each participating classroom. Each disk contains a litany of video and audio assets. Each asset is selected for its educational value. Typical video assets might include a series of moving and still pictures depicting weather or other natural conditions for example.

The assets included in the DVD disks are augmented by one or more supplemental websites. The supplemental website(s) include(s) a series of lesson plans that are organized to use the assets included on the DVD disks. The supplemental website(s) may also include its (their) own audio and video assets that may also be used as part of the lesson plans.

Teachers in participating classrooms use the interactive appliance to present interactive multimedia-based lessons to students. The lessons include text (typically taken from the supplemental website(s)) with audio and video assets (typically taken from the DVD disks). Lessons may also include links to other websites that contain educational materials wherever those sites are located on the World Wide Web.

Each interactive appliance executes an initialization sequence before beginning the lesson process. This initialization sequence can be executed as part of the system power-on or at any other suitable time. As part of the initialization sequence, each interactive appliance identifies the locality in which it is operating. For most embodiments, this determination is made interactively by querying the teacher using the interactive appliance. For other embodiments, the determination of locality may be made using different techniques.

Once the locality of operation has been identified, each interactive appliance executes a search. The search is directed at a series of websites that are known to include educational performance standards. The search returns educational performance standards that apply to the identified locality of operation.

Teachers use the locally relevant educational performance standards returned by the search to select an appropriate lesson plan included on the supplemental website. This allows teachers to present lesson plans that are consistent with and will assist students in meeting the educational performance standards that apply to their localities.

Other aspects and advantages of the present invention will become apparent from the following descriptions and accompanying drawings.

BRIEF DESCRIPTION OF THE DRAWINGS

For a more complete understanding of the present invention and for further features and advantages, reference is now made to the following description taken in conjunction with the accompanying drawings, in which:

FIG. 3 is a block diagram showing the relationship between the interactive appliance and content available on the World Wide Web.

FIG. 4 is a flowchart showing the steps associated with an embodiment of the method of the present invention.

DETAILED DESCRIPTION OF THE PREFERRED EMBODIMENTS

The preferred embodiments of the present invention and their advantages are best understood by referring to FIGS. 1 through 4 of the drawings. Like numerals are used for like and corresponding parts of the various drawings.

Figure 1:
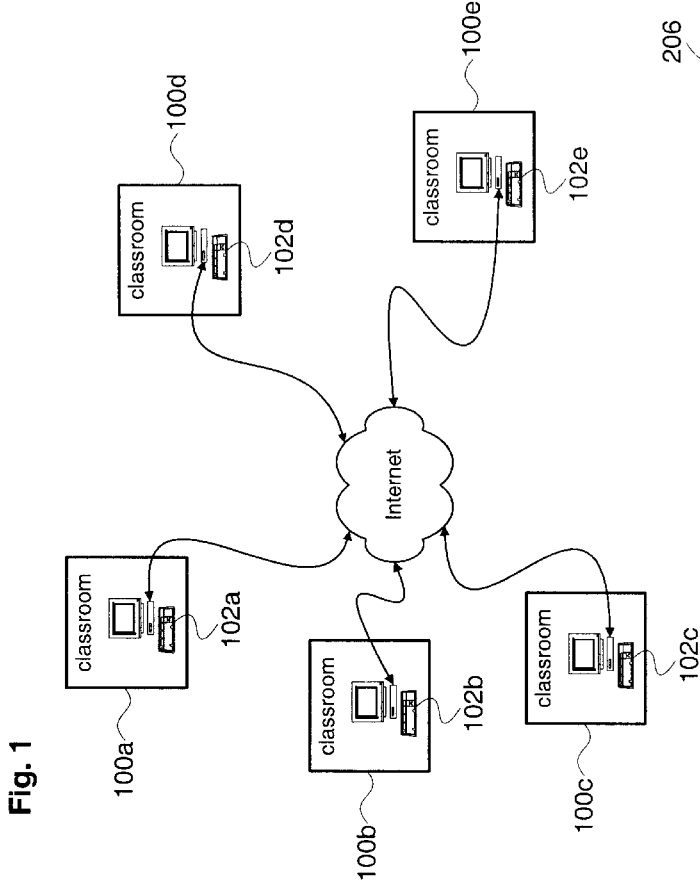
FIG. 1 is a block diagram showing the deployment of the present invention in a series of participating classrooms.

The present invention includes a system and method for adapting generic educational materials for use in different states and regions where varying student performance standards are in force. To describe an embodiment of this system and method, FIG. 1 shows a series of participating classrooms 100. Each of these participating classrooms is equipped with an interactive appliance 102. Each interactive appliance 102 can be connected to the Internet.

Figure 2:
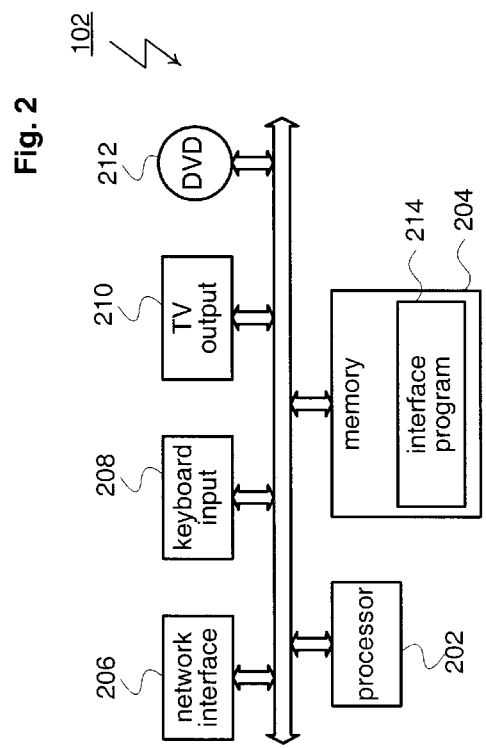
FIG. 2 is a block diagram of an interactive appliance as used within the participating classrooms of FIG. 1.

As shown in FIG. 2, each interactive appliance 102 includes control logic circuitry or a processor, or processors 202, and a memory 204. Processor 202 can be selected from a wide range of commercially available or custom types. Each interactive appliance 102 also includes a network interface 206, a keyboard input 208, and a television output 208. Network interface 206 represents a wide range of technologies, such as analog and digital modems that can be used to connect interactive appliance 102 to the Internet. Keyboard input 208 allows a keyboard or input device (such as a mouse or pointer) to be connected to interactive appliance 102. TV output 210 allows interactive appliance 102 to send display output to a television. Each interactive appliance 102 also includes a playback device 212 for a DVD or other mass storage/retrieval media. Equivalently, playback device 212 may be any non-volatile mass storage system such as "flash" memory. Interactive appliance 102 is controlled using an interface program 214 included in memory 204.

One or more DVD disks are distributed to each participating classroom 100 for use in interactive appliances 102. Each disk contains a litany of video and audio assets. Each asset is selected for its educational value. Typical video assets might include a series of moving and still pictures depicting weather or other natural conditions for example.

Interactive appliances 102 use their connections to the Internet to augment the content included on the DVD disks. The relationship between DVD content and web content is shown more clearly in FIG. 3. As that Figure shows, interactive appliances 102 access the World Wide Web to obtain three different types of content. This description refers to the first content type as supplemental. Supplemental content may include text, audio, and video assets to extend or complement the text, audio, and video assets included on the DVD disks.

Supplemental content includes also lesson plans and projects. Each lesson plan is a step-by-step scheme devised by educationalists to be followed by teachers in classrooms so as to achieve stated emotional objectives. Each project is a specific task or set of objectives to be followed by students in order to demonstrate their understanding of curriculum content. The lesson plans and projects are organized to use the assets included on the DVD disks as well as the assets included as part of the supplemental content. A sample lesson plan and a sample project are attached to this document as Appendices A and B.

For the embodiment being described, supplemental content is provided as part of a supplemental website. The supplemental website is the main point of contact between interactive appliances 102 and the World Wide Web.

The second type of content may be described as student performance standards content. This content type includes national, regional, state, and local student performance standards. Standards content is generally text-based and is available on a range of publicly accessible websites. A representative set of standards is attached to this document as Appendix C.

The third type of content is educational content. This content type is similar to materials generally found on websites of all types. Educational content is selected for its educational value and relevance to the lesson plans and projects stored on the supplementary website.

The combination of DVD and web content may be described as generic educational content. The use of the word generic conveys the idea that this content is widely applicable but not specifically contoured for use in any particular locality.

Method 400 of FIG. 4 shows the steps associated with a representative use of the interactive player 102 in a classroom 100. Method 400 begins with step 400 where interactive player 102 determines the location in which it is operating. For most embodiments, this step is performed interactively with a user supplying location information to interactive player 102. This information can be supplied using various formats, including postal ZIP codes or telephonic area codes. For other embodiments, users can specify locations using more traditional address formats such as country, state, city combinations. Still other methods may be used for still different embodiments. Step 402 may be executed as part of system initialization (system power on) or invoked at any subsequent time.

Interactive player 102 may also use non-interactive methods to determine the location in which it is operating. For one such method, the supplemental website may maintain a database that maps Internet Protocol (IP) addresses of interactive appliance 102 to physical locations. When this system is used, interactive appliances 102 may determine their locations by consulting the supplemental website. This system simplifies day-to-day operation of interactive appliances 102.

Interactive appliance sends the location information to the supplemental website in step 404. In step 406, the supplemental website uses the location information to perform a web search. The web search is directed at a predetermined list of websites that are known by the interactive appliance 102 to include standards content. The object of the search is to locate standards that apply to the location determined in step 400. The result of this search is a list of Uniform Resource Locators (URLs) each corresponding to a particular web page. Each of these web pages describes one or more student performance standards relevant to the operating location.

In step 408, the supplemental website returns the list of URLs to the interactive appliance 102.

In step 410, the user correlates the performance standards returned in the preceding step to one or more lesson plans obtained from the supplemental website. In doing so, the user (typically a teacher) modifies the contents of or selects the lesson plans to suit the particular location identified in step 400. This adapts the generic materials (i.e., the combination of DVD and web content) to be location-specific.

The user (teacher) may then use the interactive appliance 102 to present interactive multimedia-based lessons to students. The lessons include text and graphics (typically taken from the supplemental website) with audio and video assets (typically taken from the DVD disks). Lessons may also include links to other websites that contain educational materials wherever those sites are located on the World Wide Web.

In this way, the present invention provides a system and method for applying student performance standards to adapt generic educational materials for use in different states and regions. This system allows a single set of generic educational materials to be used in a wide range of differing locales. This reduces the cost and complexity associated with creating educational content and raises the learning and retention levels of students Although particular embodiments of the present invention have been shown and described, it will be obvious to those skilled in the art that changes and modifications may be made without departing from the present invention in its broader aspects, and therefore, the appended claims are to encompass within their scope all such changes and modifications that fall within the true scope of the present invention.

What is claimed is:

1. A method for correlating student performance standards to adapt generic educational materials for use in a target locale, the method comprising the steps of:

providing a generic educational content, the generic educational content including a series of assets;

providing one or more lesson plans, each lesson plan being a scripted presentation of a selected subset of the generic educational content;

performing a web-based search to generate a list of local student educational performance standards; and specifying the generic educational content to be used in meeting the local student educational performance standards.

2. A method as recited in claim 1 wherein the generic education content includes one or more lesson plans, each lesson plan being a scripted presentation of a selected subset of the assets.

3. A method as recited in claim 1 that further comprises the steps of:

determining a current location; and performing the web-based search so that each student educational performance standard is relevant to the current location.

4. The method of claim 3 wherein the current location is determined by user input comprising a postal zip code or telephone area code or locality name.

5. The method of claim 3 wherein the current location is determined by automatically correlating an IP address of an interactive appliance used in relation to the method for correlating student performance standards with the current location.

* * * * *